United States Patent
Shea et al.

(10) Patent No.: US 12,395,586 B1
(45) Date of Patent: Aug. 19, 2025

(54) TELEPHONIC FRAUD COMMUNICATION INTERCEPTION SYSTEMS AND METHODS

(71) Applicant: Wells Fargo Bank, N.A., San Francisco, CA (US)

(72) Inventors: Bradford A. Shea, Mint Hill, NC (US); Carrie Anne Hanson, Charlotte, NC (US); Aaron L. Johnson, Charlotte, NC (US); Tambra Nichols, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 238 days.

(21) Appl. No.: 18/159,437

(22) Filed: Jan. 25, 2023

(51) Int. Cl.
| | |
|---|---|
| *H04M 3/42* | (2006.01) |
| *H04M 1/57* | (2006.01) |
| *H04M 3/22* | (2006.01) |
| *H04M 15/06* | (2006.01) |

(52) U.S. Cl.
CPC ......... *H04M 3/42042* (2013.01); *H04M 1/57* (2013.01); *H04M 3/2281* (2013.01); *H04M 15/06* (2013.01)

(58) Field of Classification Search
None
See application file for complete search history.

(56) References Cited

U.S. PATENT DOCUMENTS

| | | | |
|---|---|---|---|
| 7,707,089 B1 | 4/2010 | Barton et al. | |
| 10,163,158 B2 | 12/2018 | Song et al. | |
| 10,447,838 B2 | 10/2019 | Weiss et al. | |
| 11,463,572 B1* | 10/2022 | Smith-Rose | H04M 3/42059 |
| 2002/0018546 A1* | 2/2002 | Horne | H04M 15/00 379/245 |
| 2012/0015639 A1* | 1/2012 | Trivi | H04M 3/436 455/415 |
| 2014/0105373 A1* | 4/2014 | Sharpe | H04M 3/38 379/142.05 |
| 2014/0286484 A1* | 9/2014 | Ehrlich | H04M 3/436 379/142.06 |
| 2017/0017760 A1 | 1/2017 | Freese et al. | |
| 2018/0191896 A1* | 7/2018 | Beardow | H04M 1/72469 |
| 2019/0213498 A1 | 7/2019 | Adjaoute | |
| 2021/0209621 A1* | 7/2021 | Lim | G06N 20/00 |
| 2022/0248190 A1* | 8/2022 | Garg | H04M 3/42068 |

* cited by examiner

*Primary Examiner* — Quoc D Tran
(74) *Attorney, Agent, or Firm* — SCHWEGMAN LUNDBERG & WOESSNER, P.A.

(57) ABSTRACT

A method may include receiving, over a first wired phone line interface of a computing device, a telephone call with an originating call identification; passing the telephone call to an attached phone over a second wired phone line interface; matching, at the computing device, the originating call identification to a number list of a plurality of number lists; based on the number list, assigning, using the computing device, the telephone call a threat level; and presenting, on a display device of the computing device, an identification of the threat level.

20 Claims, 4 Drawing Sheets

TELEPHONIC FRAUD COMMUNICATION INTERCEPTION SYSTEMS AND METHODS

BACKGROUND

It is often members of the most vulnerable and non-technologic-savvy population that fall prey to scams the most. For example, it is common for someone to pretend to be a friend of a grandson or granddaughter of someone and convince the grandparent to give money to help them get of jail. Other scams include companies pretending to be a person's bank or other company connection and requesting confirmation of their social security number or bank account passwords.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

In the following description, for purposes of explanation, numerous specific details are set forth to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all portions/elements are displayed simultaneously. Unless explicitly indicated as such, the use of "presenting a user interface" does not infer either one of these options.

Additionally, the elements and portions are sometimes described as being configured for a certain purpose. For example, an input element may be described as configured to receive an input string. In this context, "configured to" may mean presentation of a user interface element that can receive user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

Many fraud prevention tools rely on automated intervention to prevent fraud in real-time. For many elderly individuals, however, fraud and abuse occur not just in digital interactions, but via non-digital and real-world social engineering. Preventing this sort of elder fraud can be exceedingly difficult. A technical need exists for new tools that can prevent legacy forms of financially motivated fraud using new technological methods.

As described in more detail, this disclosure uses a fraud prevention device that may be attached to legacy technology, such as a landline phone, or that can be disposed within an environment to capture and analyze speech and take action to identify and mitigate fraudulent activity.

The fraud prevention device may be a physical device having a user interface designed for interaction with an elderly population (e.g., a large-text display, speech interface components, or the like). The device may be physically co-located with an individual's landline phone—or may be connected to the landline via phone line or other technology facilitating extraction of text spoken and received via the landline device.

The fraud prevention device may identify a call-back number of a caller or identify content of the call as potentially fraudulent and may deliver an alert to individuals in the physical environment of the terminal (e.g., via a voice service, image or video display, haptic feedback, or the like). The fraud prevention device may further provide a geographical heat map of fraud risk. The fraud prevention device may also have a "news ticker" style display that may provide education regarding common scams in the terminal's location, or in connection with the sensed content that the terminal receives (e.g., the content of phone conversations taking place on the user's phone).

Another challenge presents itself even if the fraud prevention device is installed in a user's home, that of configuration and use. As indicated above, many parts of the elderly population are not technologically capable. Thus, making any changes to a fraud prevention device may be difficult for such a person. Accordingly, remote management may be included such that authorized family members or close friends may access and configure the device. Further benefits of the described fraud prevention device may be apparent to one having ordinary skill in the art upon review of this disclosure.

Figure 1:
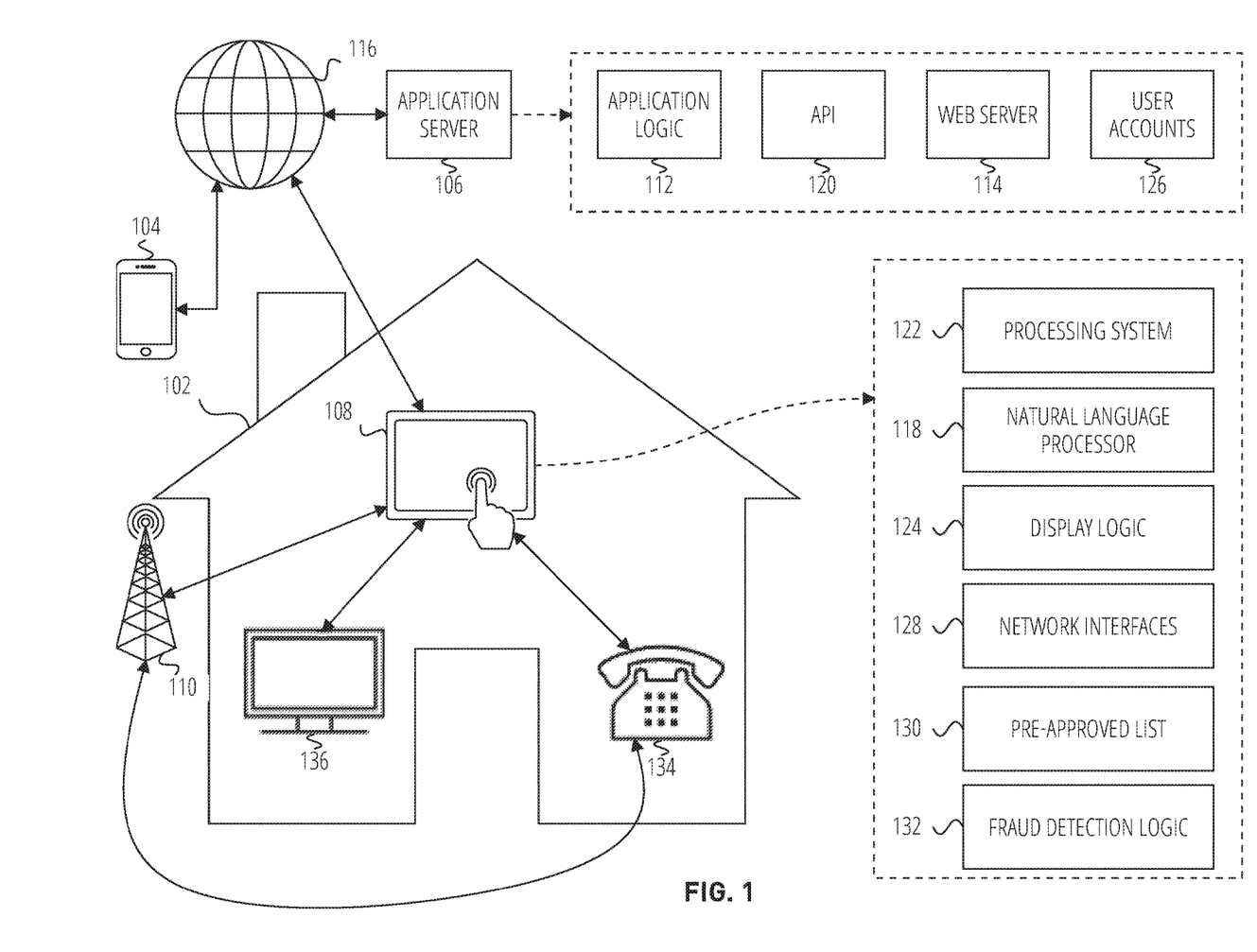
FIG. 1 is an illustration of components of a system, according to various examples.

FIG. 1 is an illustration of components of a system, according to various examples. The system comprises a residence 102, an application server 106, a fraud prevention device 108, a non-cellular phone network 110, an application logic 112, a web server 114, an internet 116, a natural language processor 118, an API 120, a processing system 122, a display logic 124, a user accounts 126, a network interfaces 128, a pre-approved list 130, a fraud detection logic 132, a non-cellular phone 134, and a smart connected device 136.

The system of FIG. 1 represents a hypothetical architecture in which a fraud prevention device is installed in a residence 102. Residence 102 may be a detached home, an apartment, etc., in which a user lives. The user may be anyone, but most of the examples herein assume the user is elderly or non-technologically savvy. The user may not have a smart phone and rely primarily on a hardwired connection such as via Voice Over IP (VoIP) over a digital subscriber line or plain old telephone service (POTS).

Fraud prevention device may include a touch screen device that is configured to use at least a certain font size with a limited number of touch buttons displayed at any given time. For example, each touch button displayed may be at least two inches wide. The minimum size of the buttons, minimum font size, and maximum concurrently shown buttons may be configurable as a setting of fraud prevention device. Fraud prevention device 108 may have multiple network interfaces (e.g., network interfaces 128) such as a first network interface for interfacing with a POTS network, a second network interface for interfacing with non-cellular phone 134, a third network interface for communicating with smart connected device 136 (e.g., a Wi-Fi interface), and a fourth interface for communicating via an external network such as internet 116. In various examples, fraud prevention device 108 may communicate with internet 116 using a cellular connection thereby not relying on an internet connection being present in residence 102 already.

The fraud prevention device may be installed in residence 102 in different configurations. In some instances, the device is installed by connecting their telephone line to fraud prevention device 108 using a first interface port and connected non-cellular phone 134 (e.g., a phone such as a cordless, analog phone) to a second interface port of fraud prevention device. In other arrangements a splitter may be used in which the telephone line may be connected to non-cellular phone 134 and fraud prevention device at the same time. In another arrangement, the telephone line may first be connected to non-cellular phone 134 and then from non-cellular phone 134 to fraud prevention device.

Furthermore, although specific components, logic., etc. (collectively elements), are illustrated as being part of either fraud prevention device 108 or application server 106 each of fraud prevention device 108 and application server 106 may perform their functions as described herein. For example, fraud detection logic 132 is illustrated as part of fraud prevention device 108, but application server 106 may also have its own fraud detection logic 132, or fraud prevention device 108 may not have fraud detection logic 132 and rely on application server 106. Similarly, application server 106 may also have a processing system even though one is not presently illustrated.

Additionally, the functionality of multiple, individual elements may be performed by a single element. An element may represent computer program code that is executable by processing system 122. The program code may be stored on a storage device and loaded into a memory of a processing system 122 for execution. Portions of the program code may be executed in a parallel across multiple processing units (e.g., a core of a general-purpose computer processor, a graphical processing unit, an application specific integrated circuit, etc.) of processing system 122. Execution of the code may be performed on a single device or distributed across multiple devices. In some examples, the program code may be executed on a cloud platform (e.g., MICROSOFT AZURE® and AMAZON EC2®) using shared computing infrastructure.

An administrative user may help configure fraud prevention device 108. An administrative user may be a family member or close friend designated to help with the user in residence 102. The administrative user may use their own device (e.g., client device 104) to interact and change settings on fraud detection logic 132 via a mobile application or website served from application server 106.

Client device 104 may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

In various examples, application server 106 may transmit configuration data to fraud prevention device 108. The configuration data may include changes to pre-approved list 130, updates to natural language processor 118, and fraud detection logic 132. The configuration data may be based on inputs of an administrative user made via client device 104.

In some examples, the communication may occur using an application programming interface (API) such as API 120. An API provides a method for computing processes to exchange data. A web-based API (e.g., API 120) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database of application server 106 or fraud prevention device 108. An API call, for example, may be made to application server 106 from fraud prevention device 108 to determine if a call currently received at residence 102 has previously been associated with fraudulent activity. APIs may be used internally as well. For example, fraud prevention device 108 may use an API call of a function of fraud prevention device 108 to determine if the incoming call has been associated with fraudulent activity.

Application server 106 may include web server 114 to enable data exchanges with fraud prevention device 108, application server 106, and client device 104. Although generally discussed in the context of delivering webpages via the Hypertext Transfer Protocol (HTTP), other network protocols may be utilized by web server 114 (e.g., File Transfer Protocol, Telnet, Secure Shell, etc.). A user may enter in a uniform resource identifier (URI) into a web client (e.g., the INTERNET EXPLORER® web browser by Microsoft Corporation or SAFARI® web browser by Apple Inc.) that corresponds to the logical location (e.g., an Internet Protocol address) of web server 114. In response, web server 114 may transmit a web page that is rendered on a display device of a client device (e.g., a mobile phone, desktop computer, etc.).

Additionally, web server 114 may enable a user to interact with one or more web applications provided in a transmitted web page. A web application may provide user interface (UI) components that are rendered on a display device of client device 104. The user may interact (e.g., select, move, enter text into) with the UI components, and based on the interaction, the web application may update one or more portions of the web page. A web application may be executed in whole, or in part, locally on client device 104. The web application may populate the UI components with data from external sources or internal sources (e.g., a data store) in various examples.

The web application may be executed according to application logic 112. Application logic 112 may use the various elements of application server 106 to implement the web application. For example, application logic 112 may issue API calls to retrieve or store data from a data store and transmit it for display on client device 104 or fraud prevention device 108. Similarly, data entered by a user into a UI component may be transmitted using API 120 back to the web server. Application logic 112 may use other elements of application server 106 to perform functionality associated with the web application as described further herein.

In various examples, the web application is a user interface that includes options for an administrative user to configure one or more fraud prevention devices 108. For example, input boxes may be presented to enter in contact details for pre-approved list 130. The contact details for pre-approved list 130 may include uploading a picture of the contact. The numbers may be close friends and family, current utility company contact numbers, and financial institution numbers. In various examples, pre-approved list 130 may be based on a government or third-party list of known "good" numbers. Conversely, an automatic block list (not illustrated) may be based on a government or third-party known bad actors list. In various examples, pre-approved list 130 and a block list may come preconfigured on fraud prevention device 108.

When the fraud prevention device 108 detects a call via non-cellular phone network 110 is from a number on pre-approved list 130, a message may be presented (e.g., via display logic 124) indicating the number is known to be in their pre-approved list—and if uploaded, a picture of the contact. Similarly, if a block list is used, non-cellular phone 134 may not ring or be set to use a screening option.

The web application may be configured to receive screening preferences of fraud prevention device 108. A screening preference may indicate what to with unknown numbers (e.g., those not stored in pre-approved list 130). One option may be to have the call forwarded to another contact to answer first. In this manner a family member may ascertain if the call is legitimate. Another option may be to have the call go to voicemail instead of ringing non-cellular phone 134.

The web application may also be configured to receive display configuration options for fraud prevention device 108. Fraud prevention device 108 may operate in more than one modality. For example, there may be an idle modality, a ringing modality, and an in-call modality. A user interface may be presented (e.g., on client device 104) to select a modality and which functions, size of the buttons for the functions, etc., to present on fraud prevention device 108. Display logic 124 may change the modality depending on the status of whether or not a call is incoming or in process.

An idle modality may include a heat map function that shows a level of alert related to recent fraud. For example, the heat map may show a map of the zip code of the residence with a translucent overlay of a color. A red color may indicate a high level of fraudulent activity, yellow a medium, and green, low activity. In various examples, the level of fraudulent activity may be determined using a third-party API that is received at application server 106. Another function may include a presentation of common fraud schemes and selectable links to learn more about the fraud schemes. The links may be to videos that are viewable on fraud prevention device 108. In various examples, the currently occurring fraud techniques scroll along the bottom portion of the device in a stock-ticker style. Another function of the idle modality may be to present a select number of contacts (e.g., as determined by an administrative user). Another heat map feature may be to display area codes or states that are seeing a high amount (e.g., at least two standard deviations above normal) of fraud attempts. The area code may be based on the caller or the receiver. As above, the level of fraud attempts for an area code may be received via an API call.

The information displayed during a ringing modality may change depending on the output of fraud detection logic 132. For example, if fraud detection logic 132 indicates a high likelihood that the caller is attempting a scam, the entire screen may go red with a message stating to not pick up. If fraud detection logic 132 indicates the caller is on the pre-approved list 130, the entire screen may light up green indicating the caller is safe and display a picture of the contact if available. If the fraud prevention device indicates the caller is neither on a block list or pre-approved list 130, the screen may be yellow.

The exact colors are for example purposes and others may be used. Similarly, graphics such as stop sign or green light may be used to convey the safeness of a caller in various examples. Function buttons may be overlaid on the green, yellow, red, etc., display screen as well. For example, an option may be presented to initiate a three-way call to a trusted contact instead of answering the phone. Another option may be to have the call be sent to a screening contact.

The in-call modality may include a picture of the current contact, if available. In various examples, the modality may include an overlay color to indicate a risk level in a manner like that of the ringing modality. If natural language processor 118 detects the user is giving out a pattern of numbers that corresponds to a social security number or bank account, a message may be presented that indicates to the user to confirm the person calling is safe to give the information to. Additionally, an option to hang up the current call and initiate a call to their bank may be presented in case the user is unsure if the caller is from their bank.

The display configuration options, pre-approved list 130, screening preferences, etc., may be stored in a structured data file according to a schema (e.g., an extensible markup language format). The structured data file may be transmitted to fraud prevention device 108 in response to periodic pull requests made by fraud prevention device 108 or pushed to fraud prevention device 108 when changes are made. Processing system 122 may parse the received data structure file and apply changes to local versions of pre-approved list 130, configuration options, screen preferences, etc.

A user may not always be within visual range of fraud prevention device 108. Accordingly, fraud prevention device 108 may communicate with other display devices in the user's residence 102. For example, smart connected device 136 may be a television or smart phone (e.g., a message or information may be displayed as a push notification). Smart connected device 136 may receive instructions from fraud prevention device 108 to overlay (on top of existing content)

a duplicate version of what is displayed on fraud prevention device 108. Thus, even if the user is using a portable phone, the user may see the current risk level. Smart connected device 136 may also be a smart phone of the user that may receive push notifications of a risk level of an incoming call to non-cellular phone 134.

Fraud detection logic 132 and natural language processor 118 may work together to determine a risk level (e.g., low, medium, high) for an incoming call or in progress call. In various examples, fraud detection logic 132 queries a stored list of numbers or uses an API to see if the caller is on a list of known bad actors. If a match is made, the risk level may be considered high. If the caller matches a number in pre-approved list 130 it may be considered a low risk.

Natural language processor 118 may perform real-time voice-to-text translation and use pattern matching to determine if a user may have divulged personally identifiable information (PII). The processing may occur locally on fraud prevention device 108 to maintain a user's privacy. One pattern may be saying nine numbers in a row (e.g., the number of numbers in a social security number). Another pattern may be to match to a set of words associated with PII such as "bank account," "password", or "username." If natural language processor 118 indicates a match to a pattern, a message may be transmitted to display logic 124 to display a message on fraud prevention device 108 indicating possible PII has been said on the call.

Application server 106 and fraud prevention device 108 may include a data store for data used by application server 106 and fraud prevention device 108. The specific storage layout and data model used may take several forms-indeed, a data store may utilize multiple models. A data store may be, but is not limited to, a relational database (e.g., SQL), non-relational database (NoSQL) a flat file database, object model, document details model, graph database, shared ledger (e.g., blockchain), or a file system hierarchy. A data store may store data on one or more storage devices (e.g., a hard disk, random access memory (RAM), etc.). The storage devices may be in standalone arrays, part of one or more servers, and may be in one or more geographic areas User accounts 126 may include user profiles on administrative users of application server 106. A user profile may include credential information such as a username and hash of a password. A user may enter in their username and plaintext password to a login page of application server 106 to view their user profile information or interfaces presented by application server 106 in various examples. A user profile may also identify one or more fraud prevention devices 108 the administrative user is authorized to manage.

Figure 2:
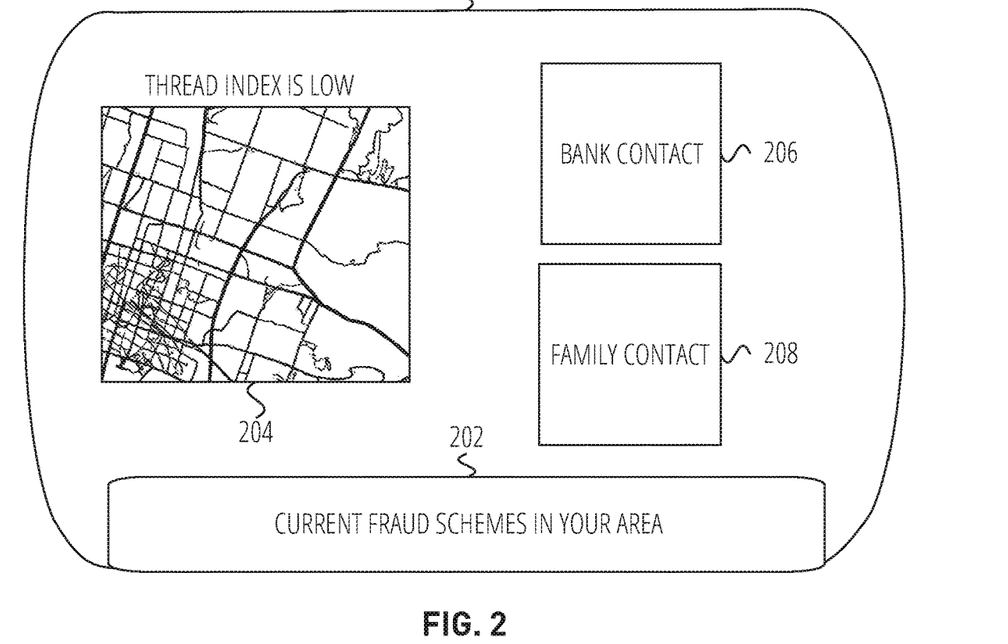
FIG. 2 is a user interface of a fraud prevention device, according to various examples.

FIG. 2 is a user interface of a fraud prevention device, according to various examples. FIG. 2 includes fraud prevention device 108 as may be presented in an idle modality. As seen, there is a fraud ticker 202 displayed at the bottom of the display that may scroll with the latest fraud schemes. A user may touch the screen to pull up more information on the schemes. For example, the user may be taken to a website explaining the scheme and how to avoid it. FIG. 2 also include threat map 204 indicating that application server 106 may have pushed down a message that few fraud schemes have been occurring in the user's area (e.g., city). Lastly, bank contact 206 and family contact 208 may be presented with contact details should the user wish to make a phone call.

Figure 3:
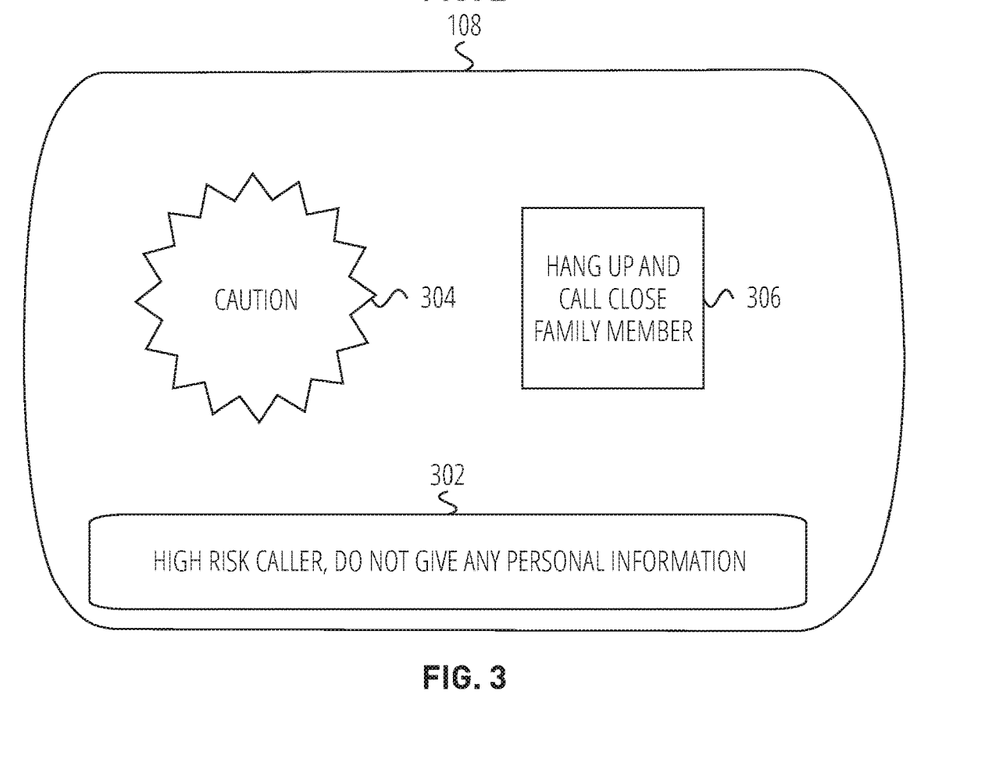
FIG. 3 is a user interface of a fraud prevention device, according to various examples.

FIG. 3 is a user interface of a fraud prevention device, according to various examples. FIG. 3 includes fraud prevention device 108 as may be presented in an in-call modality. In this example, the current caller may have been on a known-bad-actors list. Fraud detection logic 132 may have matched the caller identification information to the list. Consequently, message 302 and warning symbol 304 may be presented to warn the user to proceed with caution. Additionally, call button 306 may be presented with a message to hang up and call a close friend if the user believes they have been the victim of a scam (or are unsure).

Figure 4:
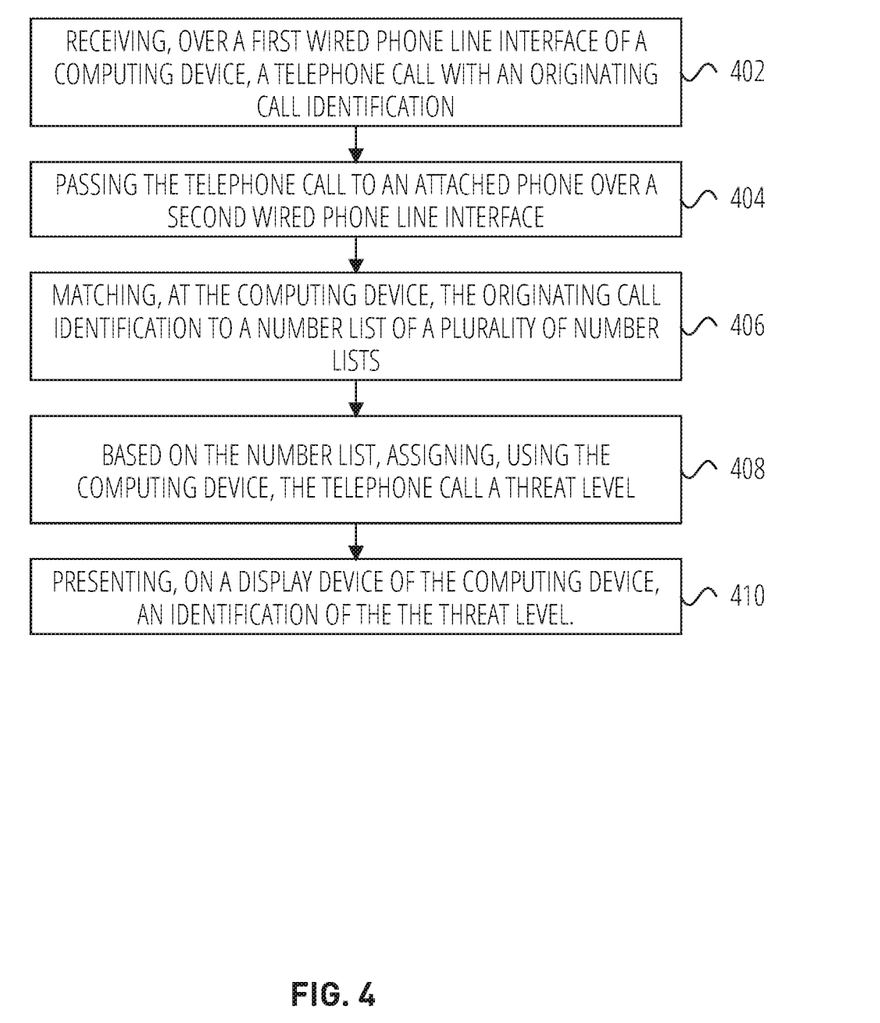
FIG. 4 is a flowchart illustrating operations of a method, according to various examples.

FIG. 4 is a flowchart illustrating operations of a method, according to various examples. The method is represented as a set of blocks that describe operations 402 to 410. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 4. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

According to various examples, the method includes receiving, over a first wired phone line interface of a computing device, a telephone call with an originating call identification at operation 402. The computer device may be fraud prevention device 108. The first wired phone line interface may be connected to a POTS telephone network, in various examples.

According to various examples, the method includes passing the telephone call to an attached phone over a second wired phone line interface at operation 404. Passing may include allowing the signal/data from the telephone network to be transmitting, unmodified, to a telephone (e.g., non-cellular phone 134).

According to various examples, the method includes matching, at the computing device, the originating call identification to a number list of a plurality of number lists at operation 406.

The method may also include where the plurality of number lists includes a low threat level list and a high threat level list. The low threat level list may be a list such as pre-approved list 130. The high threat level list may be a list that includes numbers associated with past fraudulent activity.

According to various examples, the method includes based on the number list, assigning, using the computing device, the telephone call a threat level at operation 408. For example, a known caller of pre-approved list 130 may be a low threat.

According to various examples, the method includes presenting, on a display device of the computing device, an identification of the threat level at operation 410. For example, display logic 124 may update the user interface of fraud prevention device 108. For example, when the number list is the high threat level list the computing device may present a message indicating the originating call identification has been associated with fraudulent activity. Additionally, there may be a selectable option to add a trusted caller to the telephone call and a selectable option to end the telephone call. Commands to add a caller or end the call may be transmitted to non-cellular phone 134 using the second wired phone line interface, in various examples.

The method may also include transmitting a notification to a television computing device over a third network connection interface, identifying the originating call identification as having been associated with fraudulent activity.

The method may also include when the number list is the low threat level list, presenting, on a display device of the computing device, an identification of the threat level includes presenting a user interface on the computing device including a picture of a person associated with the originating call identification, and a message indicating the originating call identification is from a safe contact.

The method may also include further includes receiving an update to the low threat level list from a remote management server. The remote management server may be application server 106.

The method may also include where the update to the low threat level list includes a utility company providing a utility to a residence associated with the computing device.

The method may also include further includes transmitting an API call to receive an update to the high threat level list.

The method may also include further includes receiving, at the computing device, an indication of fraudulent activity in a geographic area (e.g., from fraud prevention device 108), determining, at the computing device, that the computing device is within the geographic area (e.g., using an IP address), and based on the determining, displaying an alert on the computing device identifying the fraudulent activity. Other technical features may be readily apparent to one skilled in the art from the following figures, descriptions, and claims.

Figure 5:
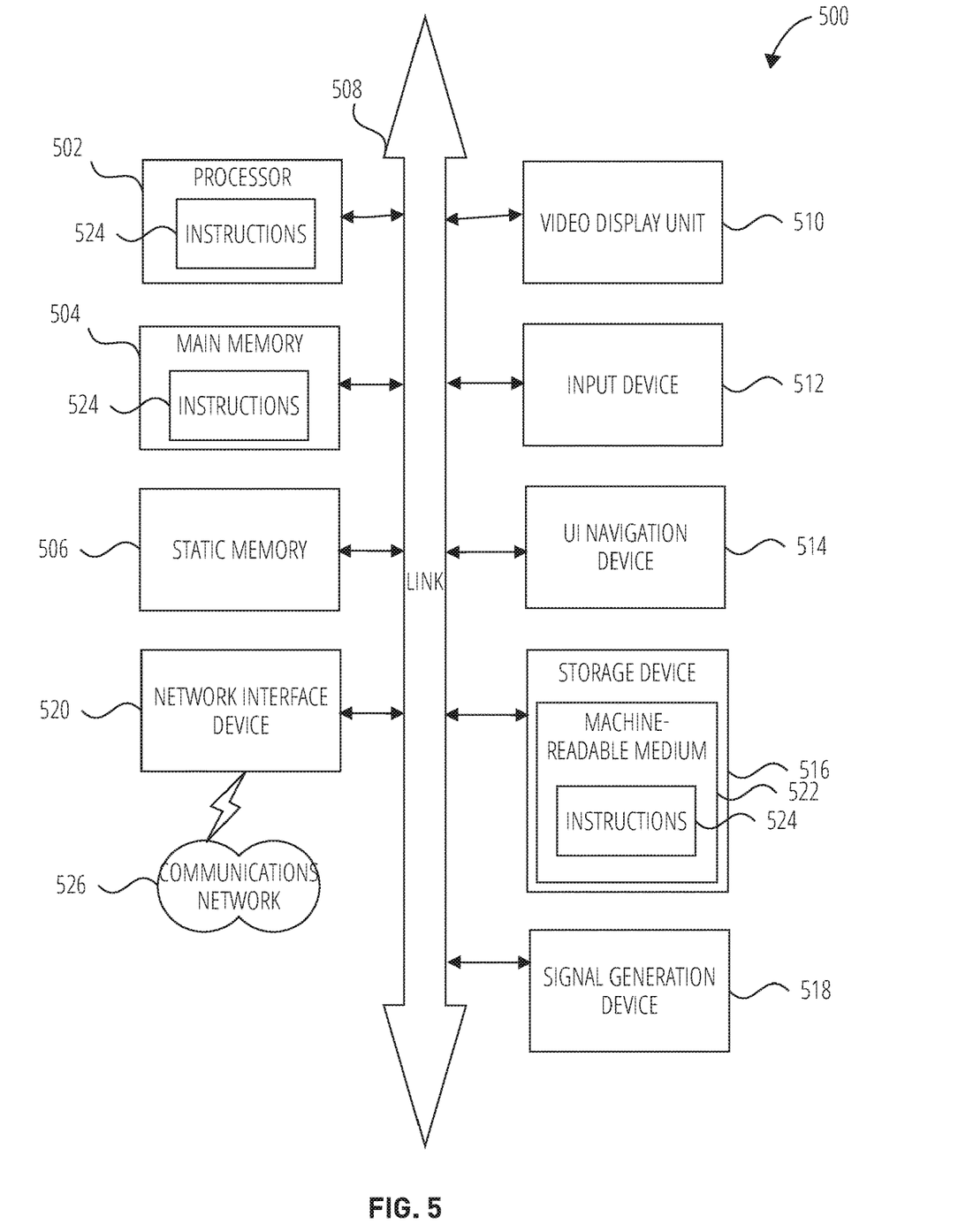
FIG. 5 is a block diagram illustrating a machine in the example form of computer system 500, within which a set or sequence of instructions may be executed to cause the machine to perform any one of the methodologies discussed herein, according to various examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPL), a graphics processing unit (GPUT) or both, processor cores, compute nodes, etc.), a main memory 504 and a static memory 506, which communicate with each other via a link 508. The computer system 500 may further include a video display unit 510, an input device 512 (e.g., a keyboard), and a user interface (UI) UI navigation device 514 (e.g., a mouse). In one embodiment, the video display unit 510, input device 512, and UI navigation device 514 are incorporated into a single device housing such as a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensors.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed Database, and/or associated caches and servers) that store the one or more instructions 524. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 522 that excluded transitory signals.

The instructions 524 may further be transmitted or received over a communications network 526 using a transmission medium via the network interface device 520 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
receiving, over a first wired phone line interface of a computing device located at a residence, a telephone call with an originating call identification;
passing the telephone call to an attached non-cellular phone, located at the residence, over a second wired phone line interface of the computing device;
matching, at the computing device, the originating call identification to a number list of a plurality of number lists;
based on the number list, assigning, using the computing device, the telephone call a threat level; and
presenting, on a display device of the computing device, an identification of the threat level.

2. The method of claim 1, wherein the plurality of number lists includes a low threat level list and a high threat level list.

3. The method of claim 2, wherein the number list is the high threat level list and wherein presenting, on the display device of the computing device, an identification of the threat level includes:
presenting a user interface on the computing device including:
a message indicating the originating call identification has been associated with fraudulent activity;
a selectable option to add a trusted caller to the telephone call; and
a selectable option to end the telephone call.

4. The method of claim 3, further comprising:
transmitting a notification to a television computing device over a third network connection interface, the notification identifying the originating call identification as having been associated with fraudulent activity.

5. The method of claim 2, wherein the number list is the low threat level list and wherein presenting, on the display device of the computing device, an identification of the threat level includes:
presenting a user interface on the computing device including:
a picture of a person associated with the originating call identification; and
a message indicating the originating call identification is from a safe contact.

6. The method of claim 2, further comprising:
receiving an update to the low threat level list from a remote management server.

7. The method of claim 6, wherein the update to the low threat level list includes a utility company providing a utility to a residence associated with the computing device.

8. The method of claim 2, further comprising:
transmitting an API call to receive an update to the high threat level list.

9. The method of claim 1, further comprising:
receiving, at the computing device, an indication of fraudulent activity in a geographic area;
determining, at the computing device, that the computing device is within the geographic area; and
based on the determining, displaying an alert on the computing device identifying the fraudulent activity.

10. A non-transitory computer-readable medium storing instructions, which when executed by a processing unit, configure the processing unit to perform operations comprising:
receiving, over a first wired phone line interface of a computing device located at a residence, a telephone call with an originating call identification;
passing the telephone call to an attached non-cellular phone, located at the residence, over a second wired phone line interface of the computing device;
matching, at the computing device, the originating call identification to a number list of a plurality of number lists;
based on the number list, assigning, using the computing device, the telephone call a threat level; and
presenting, on a display device of the computing device, an identification of the threat level.

11. The non-transitory computer-readable medium of claim 10, wherein the plurality of number lists includes a low threat level list and a high threat level list.

12. The non-transitory computer-readable medium of claim 11, wherein the number list is the high threat level list and wherein presenting, on the display device of the computing device, an identification of the threat level includes:
presenting a user interface on the computing device including:
a message indicating the originating call identification has been associated with fraudulent activity;
a selectable option to add a trusted caller to the telephone call; and
a selectable option to end the telephone call.

13. The non-transitory computer-readable medium of claim 12, wherein the instructions, which when executed by a processing unit, further configure the processing unit to perform operations comprising:
transmitting a notification to a television computing device over a third network connection interface, the notification identifying the originating call identification as having been associated with fraudulent activity.

14. The non-transitory computer-readable medium of claim 11, wherein the number list is the low threat level list and wherein presenting, on the display device of the computing device, an identification of the threat level includes:
presenting a user interface on the computing device including:
a picture of a person associated with the originating call identification; and
a message indicating the originating call identification is from a safe contact.

15. The non-transitory computer-readable medium of claim 11, wherein the instructions, which when executed by a processing unit, further configure the processing unit to perform operations comprising:
receiving an update to the low threat level list from a remote management server.

16. The non-transitory computer-readable medium of claim 15, wherein the update to the low threat level list includes a utility company providing a utility to a residence associated with the computing device.

17. The non-transitory computer-readable medium of claim 11, wherein the instructions, which when executed by a processing unit, further configure the processing unit to perform operations comprising:
transmitting an API call to receive an update to the high threat level list.

18. The non-transitory computer-readable medium of claim 10, wherein the instructions, which when executed by a processing unit, further configure the processing unit to perform operations comprising:
- receiving, at the computing device, an indication of fraudulent activity in a geographic area;
- determining, at the computing device, that the computing device is within the geographic area; and
- based on the determining, displaying an alert on the computing device identifying the fraudulent activity.

19. A system comprising:
a processing unit; and
a storage device storing instructions, which when executed by the processing unit, configure the processing unit to perform operations comprising:
- receiving, over a first wired phone line interface of a computing device located at a residence, a telephone call with an originating call identification;
- passing the telephone call to an attached non-cellular phone, located at the residence, over a second wired phone line interface of the computing device;
- matching, at the computing device, the originating call identification to a number list of a plurality of number lists;
- based on the number list, assigning, using the computing device, the telephone call a threat level; and
- presenting, on a display device of the computing device, an identification of the threat level.

20. The system of claim 19, wherein the plurality of number lists includes a low threat level list and a high threat level list.

* * * * *